_United States Patent Office_

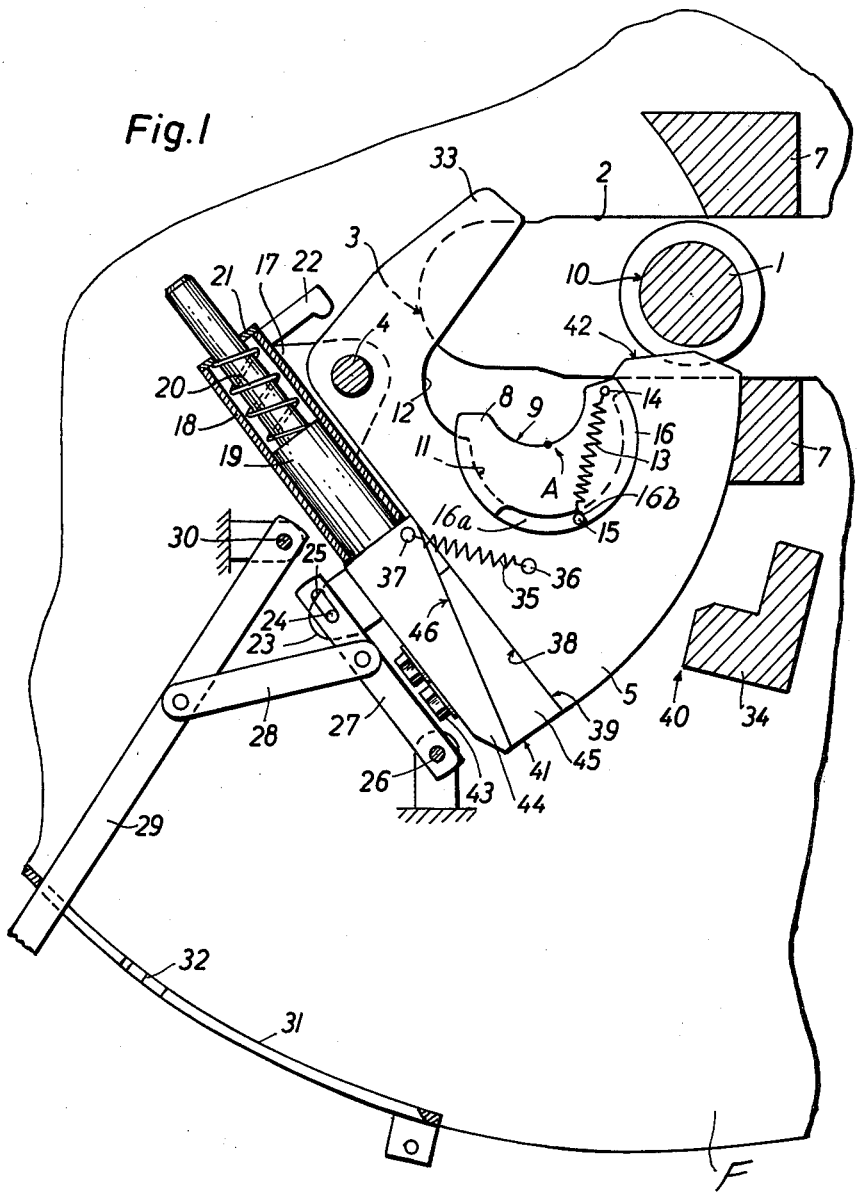

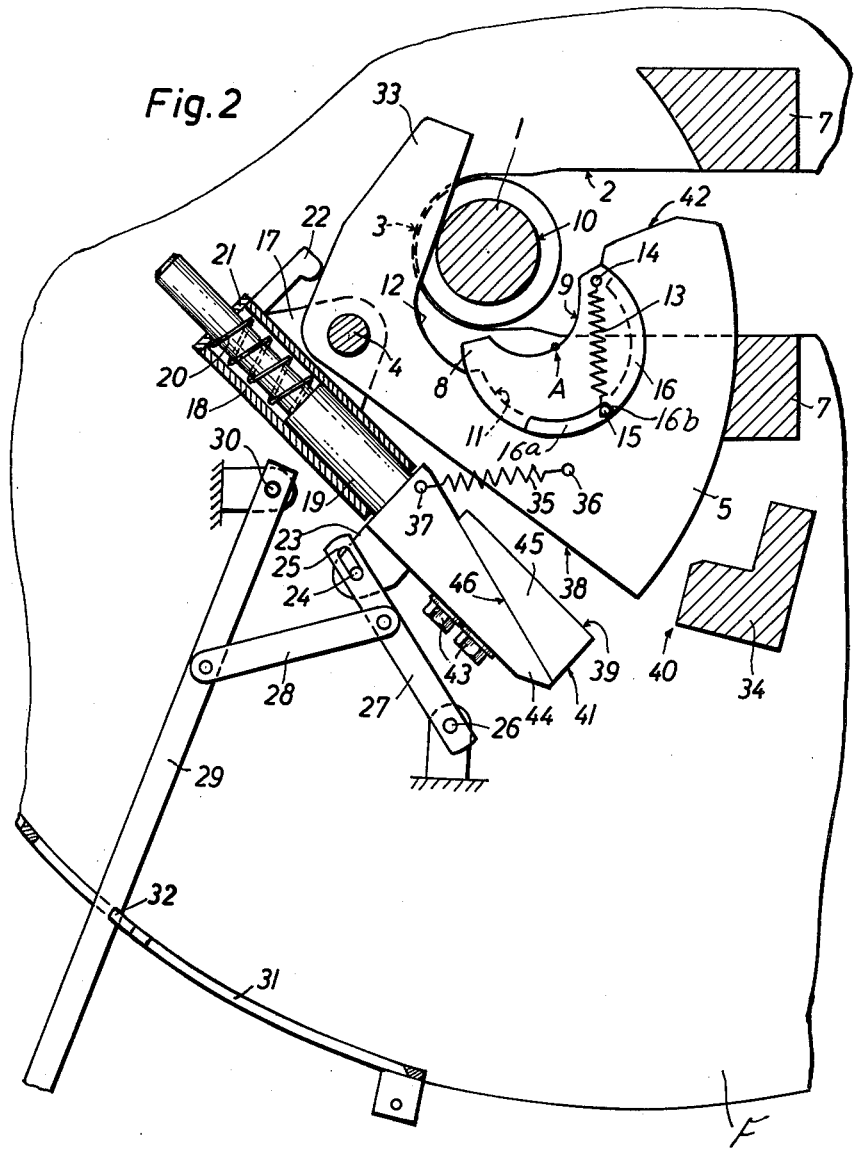

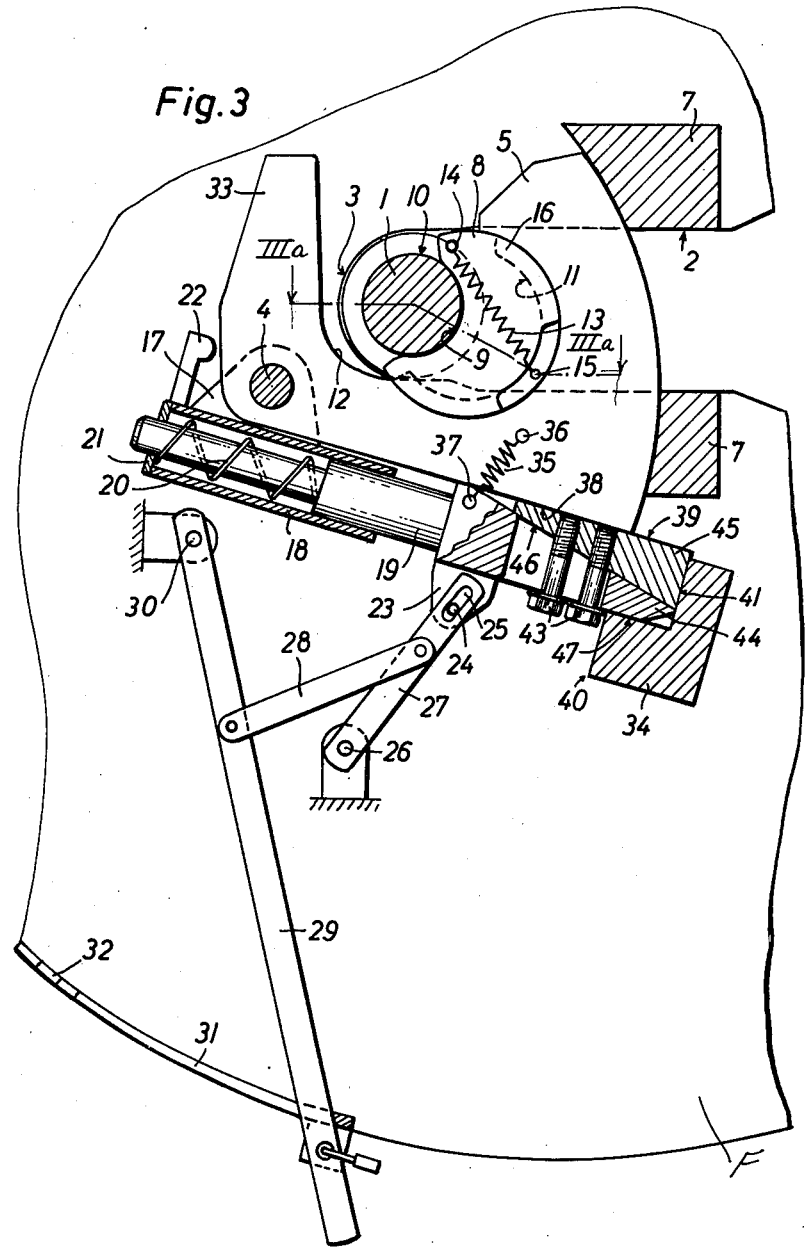

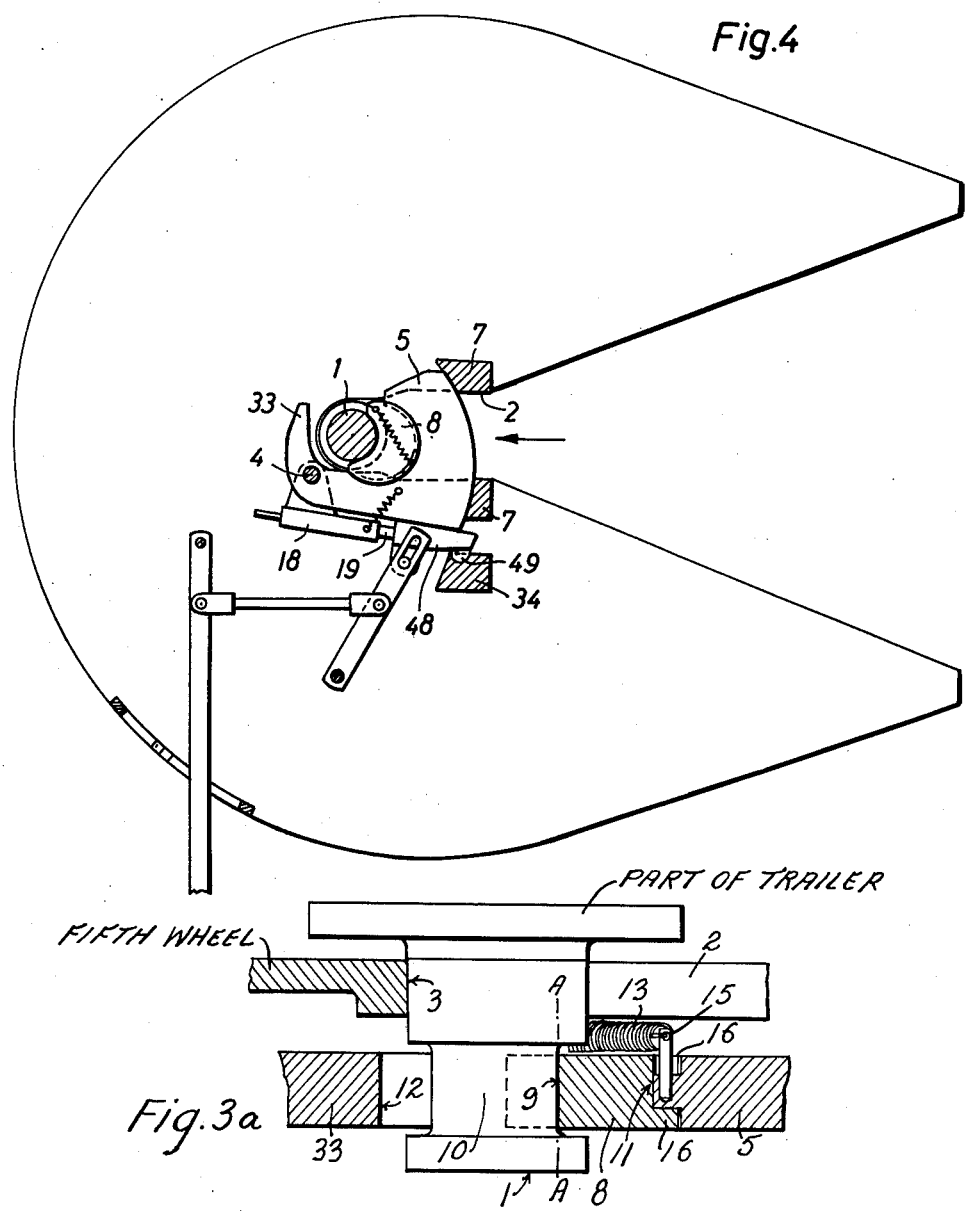

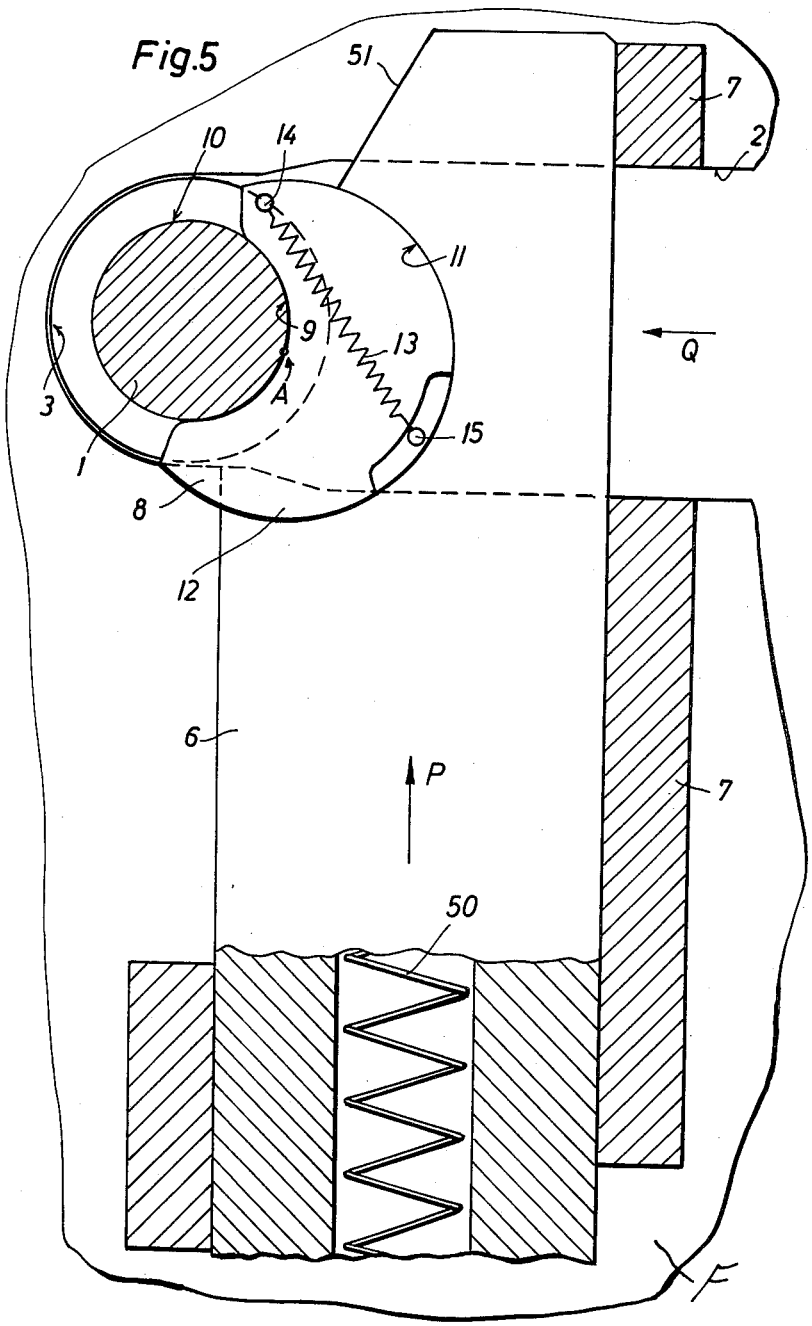

3,034,805
Patented May 15, 1962

3,034,805
FIFTH-WHEEL COUPLING FOR
TRACTOR-TRAILERS
Hans Becker, Dusseldorf, Germany, assignor to Toussaint
& Hess Hydraulische Hebezeugfabrik G.m.b.H., Dusseldorf, Germany
Filed Jan. 5, 1961, Ser. No. 80,871
Claims priority, application Germany Jan. 8, 1960
6 Claims. (Cl. 280—434)

The known couplings for tractors comprise a coupling pin extending vertically downwards from a carrier and a horizontal slot on the tractor which is open towards the rear. For making the coupling, the tractor is driven under the carrier, so that the pin enters into the slot. When the pin has arrived at the end of the slot, it is fixed by a securable locking member which engages over the slot and partly surrounds the pin. It is important to enclose the pin so that it is as free from play as possible and to make as close contact as possible between the pin, the walls of the slot and the locking member in order to keep the superficial pressure low and reduce wear. The invention, therefore, has this object in view.

According to the invention, a segment provided with a concave cylindrical surface conforming to the external periphery of the coupling pin is mounted on the inside of the locking member on a vertical axis, so as to be rotatable against the force of a spring and in the coupled position is displaced towards the axis of the coupling pin. When the locking member is brought into the locking position, the segment can adjust itself freely and, therefore, ensures a close engagement between the pin and the concave inner surface of the segment which constitutes one part of the locking member. The arrangement of the axis about which the segment turns prevents the segment from moving aside under the action of the traction force or a force acting at right angles thereto as occurs when travelling in a curved path.

A particularly simple and neat construction is obtained when the axis of rotation of the segment is situated on that half of the periphery of the pin which faces towards the open end of the slot.

Fundamentally, it is immaterial whether the locking member is mounted so as to be displaceable or swingable. The swingable mounting, however, is preferable. Then, the locking member has the form of a hook and the segment offers the further advantage that the locking member need only make a relatively small angle of rotation between the coupled and uncoupled positions.

For securing the locking member, there may be used a sliding member which, in the secured position, is situated between the locking member and a fixed support and can be retracted against the action of a spring by means of a suitable linkage. In a preferred embodiment of the invention this linkage is such that, when the locking member is unsecured, this is moved out of the coupling position and transferred into a position from which it is pressed into an open position by the pin leaving the slot. It is of particular advantage to construct the linkage kinematically in such a manner that it passes through a dead-center position when the locking member is transferred by the pin into the completely released position, so that it together with the linkage is held by spring force in the open position. In this case, a projecting part can be provided on the locking member against which the coupling pin bears when being introduced into the slot, in order to bring the locking member again into the coupled position on passing through the dead-center position.

Three constructional embodiments of the invention are illustrated, by way of example, in the accompanying drawings. The coupling pin, which is shown wholly or partly in the slot, is illustrated in cross-section, and the carrier to be coupled to the tractor is considered as being situated above the plane of the drawings. In the drawings, FIGURE 1 illustrates in a view from below the first embodiment of the coupling while the tractor is being moved backwardly towards the carrier and the coupling pin is entering the coupling slot;

FIGURE 2 shows also in a view from below an intermediate position during uncoupling;

FIGURE 3 illustrates the coupled position in a view from below;

FIG. 3a is a view taken along line IIIa—IIIa of FIG. 3;

FIGURE 4 shows in plan view the second embodiment in the coupled position; and

FIGURE 5 illustrates in view from below the third embodiment in the coupled position.

In all three illustrated embodiments a downwardly projecting coupling pin 1 is disposed on a carrier 12 (FIG. 3a) which is situated above the plane of the drawing of FIGS. 1, 2, 3, 4 and 5 and is, therefore, not visible in these views. On effecting the coupling, the pin 1 is introduced into a slot 2 on the tractor part or fifth wheel F of the coupling. This slot is open towards the rear and in all three embodiments is funnel-shaped as shown in FIGURE 4. When in the coupled position, the pin is situated free from play at the closed front end 3 of the slot as shown in FIGURES 3 to 5. Further, in all the embodiments the pin 1, when in the coupled position, is secured by a locking member which engages over the slot 2 and in FIGURES 1 to 4 is in the form of a swingable member 5 which is mounted on a pivot 4, whereas in FIGURE 5 it is in the form of a sliding member 6. The locking member, when in the coupled position, is supported directly against an abutment 7.

An important element of the coupling is a segment 8 which is rotatably mounted in the locking member. The segment 8 has a concave cylindrical surface 9 the radius of which is the same as that of the cylindrical section 10 of the pin 1 to be encompassed by the locking member. The segment 8 can turn about an imaginary axis A which is parallel to the axis of the pin 1 and appears in plan view in the drawing as a point or as a dash-dot line A in FIG. 3a. The axis A is situated in the concave cylindrical surface 9 or more precisely forms a generator of this surface. The actual bearing surface for the segment is formed by a concave surface 11 concentric to the axis A which represents part of a recess 12 of the locking member 5 or 6. The segment 8 has a corresponding convex cylindrical surface which bears against the surface 11. A spring 13 which is fixed at 14 to the segment and by means of a pin 15 to the locking member tends to rotate the segment right-handedly into an end position, which is fixed by a stop means formed between the pin 15 and an abutment 16b of a slot 16a through which pin 15 protrudes through segment 8. This position is shown in FIGURES 1 and 2. The segment 8 is secured against movement in the axial direction, that is to say at right angles to the plane of the bottom view figures by flanges 16 of which the external diameter is greater than that of the cylindrical surface 11, the flanges engaging above and below the locking member. Only the upper of these flanges is visible in FIGURES 1 to 4. In FIGURE 5 the flanges have been omitted for the sake of simplicity.

In the embodiment shown in FIGURES 1 to 3, a sleeve 18 has an eye 17 by means of which it can swing about the pivot 4 of the swingable locking member 5. A slider 19 is movable in the sleeve 18. A spring 20 which is supported against the closed end 21 of the sleeve tends to press the slider 19 out of the open end of the sleeve 18. The sleeve 18 has a projecting member 22 which coacts with the locking member 5 as hereinafter explained. The end 23 of the slider 19 is provided with an eye or bracket 23 and a pin 24 which projects into an oblong hole 25 in a lever 27 pivoted on a fixed point 26. The lever 27 is connected by a link 28 to an actuating lever 29 which can turn about a fixed point 30 and either carries a handle at its free end or is coupled to a hydraulic or pneumatic drive. The lever 29 projects through a curved guide slot 31, the ends of which act as stops to limit the stroke of the lever. The guide slot has a notch 32 intermediate its ends. The locking member 5 has a part 33 which projects beyond the slot 2. Finally an angle-shaped fixed support 34 is also provided, the object of which is hereinafter described.

In the position shown in FIGURE 1, the coupling is open. A spring 35 which is fixed at 36 to the locking member and at 37 to the slider 19 holds the side surface 38 of the locking member 5 against the side surface 39 of the slider 19. Since the lever 27, in FIGURE 1, is parallel to the sleeve 18, the spring 20 tends to rotate the sleeve, together with the slider, right-handedly. This rotation is limited by a stop which is not illustrated.

If the tractor is moved backwards towards the coupling pin, the pin 1 enters the slot 2. After passing through the position shown in FIGURE 1 it meets the projecting part 33 and rotates the locking member 5 left-handedly. The engagement of the part 33 with the member 22 first rotates the sleeve 18 together with the slider 19 right-handedly against the action of the spring 20, the locking member 5 being carried with it. Soon after this, the system passes through a dead-center position and the spring 20 from there on acts to rotate the sleeve 18, the slider 19 and the locking member 5 right-handedly. In the course of this rotation, the segment 8 meets the cylindrical surface 10 of the pin 1 without, however, this surface at once coinciding with the surface 9. This condition is, however, established automatically in the course of the further movement by the transfer of the pin 1 into the position shown in FIGURE 3 in which it meets the end 3 of the slot.

The distances apart of the individual pivot points are so chosen that the slider 19 on the swinging of the sleeve 18 passes over the edge 40 of the support 34 before its front end 41 meets the support. In the further course of the movement the slider is fully released, so that it can anchor itself in the support 34, as shown in FIGURE 3, and thereby secures the locking member 5 in the locked position.

A tensile force acting on the pin 1 whatever its direction may be is not able to rotate the segment 8 out of the closed position, because the pivotal axis A of the segment now coincides with the cylindrical surface 10 of the coupling pin. Therefore, the segment acts like a wall which firmly surrounds the pin on one side. If the pin is worn it may happen that the surfaces 9 and 10 are no longer in contact at all points. Then, the segment will adjust itself by turning through a small amount towards the position shown in FIGURE 3, and will hold the coupling pin securely as before.

If the coupling is to be disconnected, the hand lever 29 is first brought into the position shown in FIGURE 2 against the action of the spring 20, and temporarily placed in the notch 32. Consequently the slider 19 is first withdrawn so that it is freed from the abutment 40, and the sleeve 18 can rotate right-handedly. In doing so, the projecting member 22 meets the part 33 of the locking member 5 and rotates the locking member 5 into the intermediate position shown in FIGURE 2 with the assistance of the spring 35. During this, the segment rotates right-handedly about its axis A under the action of the spring 13 until it meets the stop. If the vehicles are separated from one another, the pin 1 leaving the slot 2 meets the segment 8 and, on further movement, it meets the inclined surface 42 and forces the locking member 5 outwardly and with the remaining parts of the linkage beyond the dead-center position, so that the position shown in FIGURE 1 is re-established by the action of the spring 20.

The free end of the slider 19 consists of two parts 44 and 45 which can be connected together by bolts 43. The parts 44 and 45 have inclined surface 46 which abut against one another and enable any play at the place 47 in FIGURE 3, due to wear, to be obviated by adjustment.

The embodiments shown in FIGURE 4 differ from that of FIGURES 1 to 3 in that the free end of the slider 19 has an inclined surface 48 which, in co-operation with a half cylinder 49 mounted in the support 34, effects an automatic adjustment when play occurs. The linkages in FIGURE 4 have been shown in simplified form.

FIGURE 5 merely shows that it is possible to carry out the invention using a sliding locking member 6 instead of the swingable locking member 5. In the coupled position illustrated, this locking member, in combination with the segment 8, acts in the same way as the locking member 5 of FIGURES 1 to 4. The means for securing the locking member are not illustrated. When the locking member is retracted sufficiently far against the action of its spring 50 and in a direction opposite to that shown by the arrow, the further disconnection can be effected by separating the vehicles one from the other, so that the pin 1 effects the further movement of the locking member by bearing against the inclined surface 51.

In FIGURE 5 the locking member 6 is at right angles to the slot 2. It may be advantageous to place the locking member obliquely to the slot and in such a manner that the direction P in which it is inserted forms an acute angle with the direction Q in which the pin 1 is introduced. The path of the locking member is thereby shortened.

I claim:

1. A coupling for power vehicles, particularly for tractors and trailers, comprising a vertical coupling pin on one vehicle, means on the other vehicle forming a slot having a closed end for receiving said pin, a securable locking member movable over said slot for engaging and partly surrounding said pin, a segment provided with a concave cylindrical surface conforming to the periphery of said pin and swingably mounted on said locking member so as to be rotatable about a vertical pivot axis, and biasing means for urging said segment toward the axis of said coupling pin when said locking member is engaged with said pin.

2. A coupling according to claim 1, said vertical pivot axis of said segment being located contiguous with the half of the periphery of said coupling pin which faces the open end of said slot.

3. A coupling according to claim 2, said locking member being swingably mounted.

4. A coupling according to claim 1, said locking member being provided with a slider for securing said locking member into coupled position and a fixed abutment engageable with said slider, said slider in its secured position being disposed between said locking member and said fixed abutment, and linkage means including spring means for retracting said slider, said linkage means being operably connected to said locking member so as to simultaneously serve the purpose of transferring the locking member, after being unsecured, into a position in which it can be pressed into the open position by engagement of said pin moving out of said slot.

5. A coupling according to claim 4, said linkage means having said spring means so arranged that on opening the locking member the latter passes through a dead-center position beyond which said spring means tends to hold the locking member in the open position.

6. A coupling according to claim 5, said locking member being provided with a projecting part engageable with said coupling pin for movement thereby when said pin enters said slot to swing said locking member through said dead-center position into a coupled position, and spring means for securing said locking member into said coupled position.

References Cited in the file of this patent

UNITED STATES PATENTS

| | | |
|---|---|---|
| 1,966,839 | Walker | July 17, 1934 |
| 1,981,233 | Harris | Nov. 30, 1934 |
| 2,885,222 | Walther et al. | May 5, 1959 |
| 2,960,352 | Wood | Nov. 15, 1960 |
| 2,977,137 | Durham | Mar. 28, 1961 |